US010482695B2

(12) United States Patent
Friedman et al.

(10) Patent No.: US 10,482,695 B2
(45) Date of Patent: Nov. 19, 2019

(54) LOADING DOCK MANAGEMENT AND VEHICLE ACCESS SYSTEM

(75) Inventors: Jeffrey Friedman, White Plains, NY (US); Travis Sinnott, White Plains, NY (US); Max Abramowitz, White Plains, NY (US)

(73) Assignee: Building Intelligence, Inc., White Plains, NY (US)

( * ) Notice: Subject to any disclaimer, the term of this patent is extended or adjusted under 35 U.S.C. 154(b) by 0 days.

(21) Appl. No.: 13/476,649

(22) Filed: May 21, 2012

(65) Prior Publication Data

US 2012/0293301 A1 Nov. 22, 2012

Related U.S. Application Data

(60) Provisional application No. 61/488,384, filed on May 20, 2011.

(51) Int. Cl.
*G06F 7/04* (2006.01)
*G05B 19/00* (2006.01)
*G07C 9/00* (2006.01)

(52) U.S. Cl.
CPC ................................ *G07C 9/00103* (2013.01)

(58) Field of Classification Search
CPC .. G07C 2009/00; G07C 7/00; G07C 9/00309; B60R 25/241; G06F 21/31; G06Q 10/08
See application file for complete search history.

(56) References Cited

U.S. PATENT DOCUMENTS

| | | | | |
|---|---|---|---|---|
| 5,751,973 | A * | 5/1998 | Hassett | G01S 13/765 705/13 |
| 2005/0174258 | A1 * | 8/2005 | Yamanouchi et al. | 340/928 |
| 2005/0181765 | A1 * | 8/2005 | Mark | G06Q 10/10 455/411 |
| 2006/0082439 | A1 * | 4/2006 | Bazakos et al. | 340/5.82 |
| 2009/0021347 | A1 * | 1/2009 | Schneider et al. | 340/5.71 |
| 2010/0214083 | A1 * | 8/2010 | McNay | 340/426.1 |
| 2010/0264728 | A1 * | 10/2010 | Rickrode | 307/10.2 |
| 2012/0126939 | A1 * | 5/2012 | Chang | 340/5.53 |

* cited by examiner

*Primary Examiner* — Quan-Zhen Wang
*Assistant Examiner* — Rajsheed O Black-Childress
(74) *Attorney, Agent, or Firm* — Stroock & Stroock & Lavan LLP

(57) ABSTRACT

A system and method for managing a loading dock and access to a facility or group of facilities by providing a web-based application accessible via the Internet having vendors associated with the web-based application based upon specific needs of the facility. Vendors are provided access to a facility by a user of the web-based application by employing specific methods of identification and authorization, and the user is provided with status information regarding the vendor access. Furthermore, vendor access to a facility can be limited by the user based on various parameters. Those parameters can be used to administrate, manage and secure a facility in terms of understanding which vendors are permitted access to the facility or group of facilities. The web-based application is designed to suit the specific needs of a facility.

10 Claims, 7 Drawing Sheets

LOADING DOCK MANAGEMENT AND VEHICLE ACCESS SYSTEM

RELATED APPLICATIONS

Pursuant to 35 U.S.C. § 119, this application claims benefit to U.S. Application No. 61/488,384, filed on May 20, 2011, incorporated herein by reference in its entirety.

FIELD OF THE INVENTION

The present invention relates to system and method for managing access to a facility. More particularly, the invention is directed to managing access to a loading dock, and the vehicle traffic and deliveries in a facility using the Internet to provide an integrated system and method for managing the security and operations relating to the delivery of products and services. The word facility can be used interchangeably with any free standing structure inclusive of an office building, school, clinic, hospital, campus, plant, farm, store, distribution center, dock, port and/or stadium.

Interacting with numerous personnel in a large facility who actually request the products and/or services to be delivered, managing the security of a facility, and managing its loading dock are time consuming, inefficient, and cumbersome tasks for most administrators, security personnel and building staff.

Recent advancements in the Internet have brought, via the World Wide Web (the "Web"), a potential to automate many of the manual processes executed daily by people in large commercial office buildings, such as office administrators, office workers, security guards, property managers, building engineers and maintenance personnel.

Accordingly, it would be desirable to provide a system and method for managing a loading dock as well as deliveries to a building or any other type of facility. Furthermore, the management of vehicle traffic and insuring that a vehicle is authorized to enter a facility has significant security value by protecting a building from unauthorized vehicles, vendors and drivers.

It is a well known fact that a large portion of criminal activity and terrorism can be attributed to trucks and Improvised Explosive Devices (IEDs) delivered by vehicles. Loss prevention is another concern in many facilities. By providing a system that identifies vehicles, drivers and vendors, facility managers and security personnel can use our invention to protect the building from unlawful activity.

Another aspect of our system is to provide information to security personnel about specific authorizations, notes on various activity and a watch list or report. The premise of a vehicle report provides a guard with vehicles and vendors that they should be aware of and/or concerned about.

The difficulties, limitations and desires suggested in the preceding are not intended to be exhaustive, but rather are among many which demonstrate that prior art systems and methods for managing the provision of security and traffic management to loading docks and other facilities will admit to worthwhile improvement.

BACKGROUND OF THE INVENTION

Security is an integral function of managing a facility, and is particularly important in commercial buildings where business is conducted and valuable assets reside. Managing an energy plant, a government building, a stadium, a port, a marina, a military base or a hospital, for example, all would benefit from efficiencies in securing the premises from potentially harmful visitors, vehicles and vendors. Whether as a group of locations, buildings, a set of docks, or a single structure, managing access of vehicles and vendors is an important component to securing and managing any facility.

At the heart of the matter is the multitude of safety issues associated with providing a mechanism for managing the access of permitted vehicles, identifying threats and addressing specific risks related to insurance, too little insurance or a lack thereof. Therefore, a system and method for managing vehicle access to a facility is desired. It is important to note that by managing the access of a vehicle to a facility, the facility is simultaneously managing visitors, vendors, contractors and insurance requirements associated with the vehicle.

In large facilities, security is generally managed and maintained by a security firm and their personnel to protect the occupants of the facility, the property within the facility, and the actual structure of the facility. To that end, one of the responsibilities of the security vendor is to control access to the facility, i.e., to grant entry to authorized personnel and deny entry to others who are unauthorized. Further, the security vendor is also responsible for verifying whether certain property may be brought into or removed from the facility. Particularly, authorized personnel may access a facility by a vehicle into a garage or a loading dock, for example. Many times identifying people and vehicles and matching them with credentials and authorization is inefficient, time consuming and expensive. Moreover, current methods for managing the throughput, expected traffic and availability of a loading dock, parking area, or other area provisioned for vehicles are inefficient from the perspective of managing workflow and security.

When a vehicle arrives at a facility, it is typically the responsibility of the personnel of the security vendor to check whether the arriving vehicle is authorized to enter the facility. Presently, this procedure is generally performed manually—typically by the personnel looking up the whether the vehicle is on a provided list. However, the vehicle is generally unknown when sent by a vendor or delivery company. Even when someone within the facility schedules an individual or a contractor to visit, the personnel does not know the vehicle. And, nowadays with the vehicle itself being a significant threat to the building, not knowing whether the vehicle or vendor is permitted is exceedingly important. Generally, it is not the vehicle, but the name of the arriving person or vendor that is documented in a notebook along with associated access rights. This manual method is often time-consuming, which delays the arriving vehicle entry to the facility and delays the entry of other arriving vehicles waiting on line, possibly causing traffic as well.

Additionally, present systems and methods of managing vehicle access typically do not take proper account of the size and nature of vehicles, the purpose of the vehicles' access and their potential for harm to the facility. In some instances the vehicle is owned and managed by an entity that is sub-contracted and/or the vehicle sent is not associated with the facility. A delivery company, and/or a sub-contracted/leased fleet may be employed to perform services. In order to effectuate and understand the relationship and to grant access, the current method of finding out this information through phone calls and other manual methods is inefficient and lacks the proficiency that is required for proper management of access to facilities.

Furthermore, occasions may arise, for example at a facility, on a campus, or at a building complex etc., in which a vehicle requires a form of special permission. Special permission might be, for example, permission to access a specific area, permission to remove equipment from the facility (e.g. towing, waste removal, passenger or shipping pick-up, etc.), or permission to enter a facility outside of assigned hours. In such a case, the vehicle driver may be instructed verbally by superiors or via a service request, and must explain the access several times to security guards or personnel who question the driver throughout the access period.

Presently, to deal with this issue, security passes are generally issued manually or verbally. An office administrator, security officer, or facility manager typically hand writes or prints up the pass using a multipart form: one copy to the person requiring special permission, another copy to the facility management office for filing, and another copy to the security desk for validation. When the vehicle driver presents the security personnel with the security pass it can be very difficult for the examining personnel to validate the pass adequately and expediently. Handwriting and printouts can be difficult to read and the pass may have been issued by a person or persons who are no longer on premises (e.g. different shift) or no longer available. If the driver or workers leave the premises and a new driver is assigned to drive the vehicle, the pass will be construed as invalid since it would pertain to the initial driver and not to the vehicle or vendor.

This manual approach is very inefficient in terms of the time needed to manually generate a security pass, the overhead required to manage the attendant paperwork, as well as the time required to manually validate the pass.

The difficulties, limitations and desires suggested in the preceding are not intended to be exhaustive, but rather are among many which demonstrate that prior art systems and methods for managing the access of vendors and vehicles would welcome improvement.

Accordingly, it would be desirable to provide a system and method that served to manage vehicle and vendor access to a facility, thereby streamlining the process of managing the delivery of products and services to a facility.

SUMMARY OF THE INVENTION

It is therefore a feature and advantage of the present invention in some of the embodiments in providing a system and/or method for managing access of vendors to at least one facility.

In one exemplary embodiment, a method performed by a data processing system having a program for managing access of vendors to at least one facility, comprises the at least one of sequential, non-sequential and sequence-independent steps of: determining at least one vendor intended to visit the at least one facility; retrieving and storing, by the data processing system, sufficient identifying information to identify the at least one vendor, when sufficient identifying information has not previously been retrieved and stored; determining, by the data processing system, authorization of the at least one vendor to access the at least one facility during at least one visit to the at least one facility in accordance with at least one authorization requirement; and upon arrival of the at least one vendor at the at least one facility and prior to granting access, confirming, by the data processing system, authorization of the at least one vender responsive to the at least one authorization requirement.

In some embodiments of the method the at least one authorization requirement comprises one of a specific schedule, an estimated time of arrival, an assignment of at least one location that the at least one vendor may access within the at least one facility, a number of entries to the at least one facility per authorization, an expected duration of stay, a specific class of vehicle, a specific vehicle, a category of service provider, a specific representative of the at least one vendor, and whether the at least one vendor has met all requirements of the at least one facility.

In some embodiments the method further comprising verifying, by the data processing system, that the authorization of the at least one vendor to access the at least one facility in accordance with the at least one authorization requirement is further determined in accordance with an approval process. In some embodiments of the method, the approval process comprises at least one of verifying that all hierarchical approval required has been received and verifying that all peer approval required has been received.

In some embodiments of the method, confirming, by the data processing system, authorization of the at least one vender responsive to the at least one authorization requirement comprises confirming, by the data processing system, at least one of the at least one vendor arriving on schedule, the vehicle being identified as associated with the at least one vendor, and an individual accompanying the vehicle being identified as associated with the at least one vendor. In some embodiments of the method, a vehicle is identified by at least one of a vehicle license plate, a specialized decal, a visual marker or signal, a wireless signal, an audible signal, and a vehicle code; an individual accompanying a vehicle is identified by at least one of valid identification documentation, a radio-frequency identification (RFID) card, facial recognition, and biometric verification; and at least one identified vehicle identification or individual identification must be associated with an authorized vendor for access to be granted to the at least one facility.

In some embodiments of the method, the method further comprising auditing, by the data processing system, the at least one vendor's activity while the vendor is granted access to the at least one facility. In some embodiments of the method, auditing, by the data processing system, comprises recording at least one of time of arrival at the at least one facility, a user responsible for check-in of the at least one vendor, authority for check-in, identity of the at least one vendor's representative, identity of the at least one vendor's vehicle, an assigned parking spot, slip, or bay, movement of the at least one vendor throughout the at least one facility, and at least one area where the at least one vendor is authorized to access within the at least on facility. In some embodiments of the method, the step of retrieving and storing further comprises determining whether sufficient identifying information to identify the at least one vendor has previously been retrieved and stored in the system, and if not, retrieving and storing the identifying information of the at least one vendor in the system.

In another exemplary embodiment, a computer implemented system having a program for managing access of vendors to at least one facility comprises: a computer network; a computer processor retrieving sufficient identifying information to identify at least one vendor intended to visit the at least one facility, when sufficient identifying information has not previously been retrieved; a database, connected to the computer network, storing the retrieved identifying information of the at least one vendor; and a user module interactive with the computer processor and the database, and determining authorization of the at least one vendor to access the at least one facility during at least one visit to the at least one facility in accordance with at least one authorization requirement, the user module confirming authorization of the at least one vender responsive to the at least one authorization requirement upon arrival of the at least one vendor at the at least one facility and prior to granting access.

In some embodiments of the system, the at least one authorization requirement comprises one of a specific schedule, an estimated time of arrival, an assignment of at least one location that the at least one vendor may access within the at least one facility, a number of entries to the at least one facility per authorization, an expected duration of stay, a specific class of vehicle, a specific vehicle, a category of service provider, a specific representative of the at least one vendor, and whether the at least one vendor has met all requirements of the at least one facility. In some embodiments of the system, the user module interactive with the computer processor and the database further verifies that the authorization of the at least one vendor to access the at least one facility in accordance with the at least one authorization requirement is also determined in accordance with an approval process.

In some embodiments of the system, the user module, in accordance with the approval process, verifies at least one of receipt of all hierarchical approval required and receipt of all peer approval required.

In some embodiments of the system, the user module interactive with the computer processor and the database confirms authorization of the at least one vendor, prior to granting access, by verifying at least one of: the at least one vendor arriving on schedule, the vehicle being identified as associated with the at least one vendor, and an individual accompanying the vehicle being identified as associated with the at least one vendor.

In some embodiments, the system further comprises at least one of a vehicle identifying system and an individual identifying system, wherein the vehicle identifying system identifies at least one of a vehicle license plate, a specialized decal, a visual marker or signal, a wireless signal, an audible signal, and a vehicle code; and wherein the individual identifying system identifies an individual by at least one of valid identification documentation, a radio-frequency identification (RFID) card, facial recognition, and biometric verification.

In yet another exemplary embodiment, a system performed on a computer processor having a program for managing access of vendors to at least one facility comprises: vendor identification means for adding vendor information to the system; authorization means for authorizing an identified vendor access to the at least one facility at least one of during specific times, at specific intervals, and under certain predefined conditions; and access verifying means for verifying the identity of at least one of a vehicle requesting access to the at least one facility and an individual accompanying the vehicle, and confirming the identity in accordance with a vendor's authorization prior to granting access to the at least one facility.

In some embodiments, the system further comprises: approval means for at least one of verifying that all hierarchical approval required for a given process has been received and verifying that all peer approval required for a given process has been received. In some embodiments, the system further comprises auditing means for auditing the at least one vendor's activity while the at least one vendor is granted access to the at least one facility. In some embodiments of the system the access verifying means further comprises at least one of vehicle identifying means and individual identifying means; wherein the access verifying means verifies that identification of at least one of a vehicle and an individual accompanying a vehicle is associated with an authorized vendor prior to access being granted to the at least one facility; and wherein the access verifying means grants access responsive to at least one of the vehicle identifying means and the individual identifying means.

In some embodiments of the system the vehicle identifying means is configured to identify at least one of a vehicle license plate, a specialized decal, a visual marker or signal, a wireless signal, an audible signal, and a vehicle code; the individual identifying means is configured to identify an individual by at least one of valid identification documentation, a radio-frequency identification (RFID) card, facial recognition, and biometric verification.

BRIEF DESCRIPTION OF THE DRAWINGS

The foregoing summary, including the above and other features and advantages of the centering system and method, as well as a brief description of the preferred embodiments of the application will be better understood when read in conjunction with the appended drawings. For the purpose of illustrating the preferred embodiments of the present inventions, and to explain their operation, drawings of preferred embodiments and schematic illustrations are shown. It should be understood, however, that the application is not limited to the precise arrangements, variants, structures, features, embodiments, aspects, methods, advantages and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods, advantages, improvements and instrumentalities. In the drawings.

DETAILED DESCRIPTION OF THE INVENTION

Figure 1A:
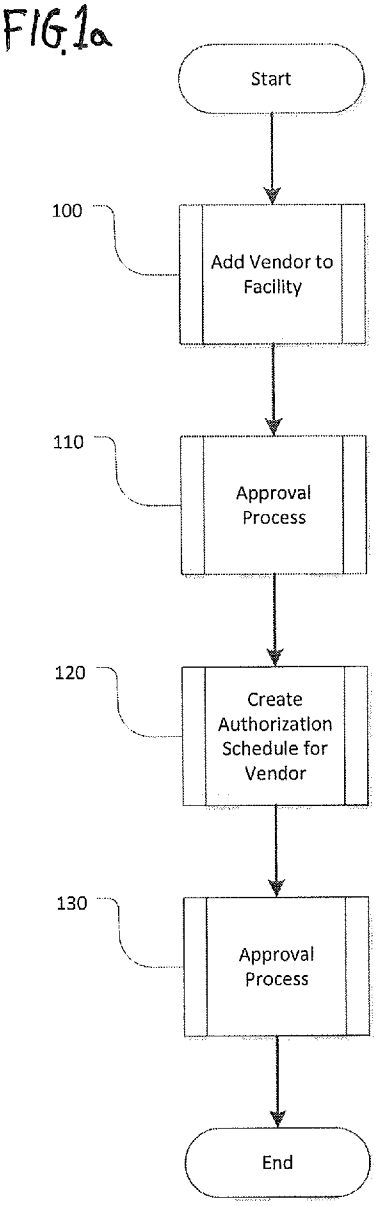
FIG. 1 is a flow diagram illustrating a high-level overview of the invention divided into two related work flows and their related sub-processes (FIGS. 1*a* and 1*b*) according to some embodiments of the present invention.

The following description includes many specific details. The inclusion of such details is for the purpose of illustration only and should not be understood to limit the invention.

Moreover, certain features which are well known in the art are not described in detail in order to avoid complication of the subject matter of the present invention. In addition, it will be understood that features in one embodiment may be combined with features in other embodiments of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Various embodiments of this invention relate to systems and methods for managing and accounting for the access of vendors, their representatives, and/or their vehicles, to all or part of a facility and usage of the facility's property (e.g. loading docks, piers, garages, warehouses, etc.) Various embodiments of this invention relate to systems and methods for automating access verification in a facility for vehicles. In some embodiments, some vehicles may initially be unknown; however, by accessing a database of previously recorded vehicle identifying information, personnel charged with maintaining vehicle security will be able to "look up" a vehicle's relationship to an authorized vendor or person quickly and efficiently. If a match is found, the security personnel can view a previously arranged authorization and grant access. In some embodiments, an authorization my be initiated by a facility user/manager etc., or by a vendor seeking access to the facility. Such vendor-initiated authorization requests may require approval by a facility user/manager.

In some embodiments, for example, at a facility or on a campus, occasions may arise in which a vehicle requires a form of special permission. Special permission might be, for example, permission to access a specific area, permission to remove equipment from the facility (e.g. towing, waste removal, passenger or shipping pick-up, etc.), or permission to enter a facility outside of assigned hours. Various embodiments of this invention therefore relate to systems and methods for managing and accounting for the access of vendors requiring special permission to access the facility.

In some example embodiments the system is comprised of one or more of the following steps and/or processes (though not necessarily in the following order):

- Vendor Identification Process: A method for adding vendor information to the system;
- Authorization Process: A method for authorizing an identified vendor access to a facility or group of facilities during specific times, at specific intervals, and/or under certain conditions;
- Approval Process: An approval process, which in some embodiments may be optional, or only applicable under certain circumstances, and which may be based on hierarchical authority;
- Access Process: A method for verifying a vehicle's identity and comparing that to a vendor's authorization;
- Accounting Process: A method for accounting for the vendor's access.

These processes are explained in further detail below.

In accordance with some embodiments of the present invention, a vendor, as referred to throughout this disclosure, can mean any individual or group that is providing goods and/or services to any other individual or group, such as, for example, a business owner, a sole proprieter, a courier, a service provider, a contractor, a manufacturer, a salesman, an owner of a fleet, taxi, rented truck, touring company, bus company, a manufacturer, a contractor, a medical practitioner, emergency vehicle, any type of business that sends people or vehicles to and from facilities, and/or any individual or entity delivering any product or service.

In accordance with some embodiments of the present invention, a vehicle, as referred to throughout this disclosure, can mean any manual or motorized vehicle, (e.g., a truck, van, automobile, train, bus, ambulance, motorcycle, scooter, bicycle, cart, etc.) aircraft (e.g., an airplane, helicopter, etc.), water craft (e.g., a boat, jetski, ship, barge, etc.), military vehicle, or any thing used to transport people and/or goods.

In accordance with some embodiments of the present invention, a user may be any individual or group of individuals that access the system. In some embodiments, depending on the system architecture and the needs of the users, individuals or groups of individuals may each have separate accounts for accessing the system.

In accordance with some embodiments of the present invention, a facility, as referred to throughout this disclosure, can mean any free standing structure or dedicated space, inclusive of, for example, an office building, store or business, garage, warehouse, dock, port, educational institution (including facilities and campuses), medical facility, construction site, factory, distribution center, stadium, government facility, and public space, etc.

Figure 1B:
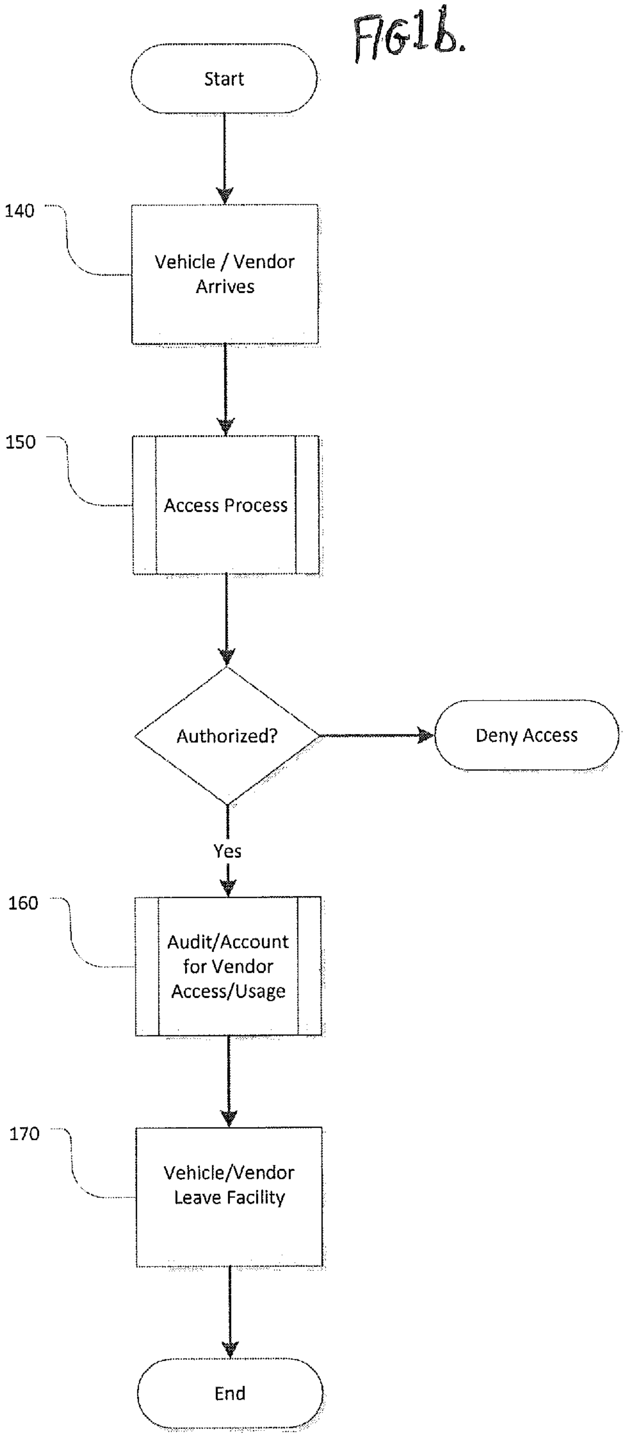

FIG. 1 illustrates a high-level overview of methods performed on systems of the invention according to some example embodiments of the invention, divided into two related work flows and their related sub-processes: FIG. 1*a* illustrates a process of adding vendors to a facility, creating authorization schedules for a vendor, and applicable approval processes; and FIG. 1*b* illustrates a process of vehicle arrival, access validation, audit process, and vehicle departure. Referring first to FIG. 1*a*, the method of FIG. 1*b* starts at Step 100, when a vendor is added to a facility in the system.

Vendor Identification Process

Representatives of the facility (tenants or facility management, hereinafter "users") add vendors to the facility by providing sufficient information to identify the vendor. Depending on the role of the person adding the vendor, the process may be subject to approval by a higher-authority user such as an office administrator, building manager, or compliance officer (see Approval Process), as seen, for example, at Step 110. This process is only required once for any one vendor to be added to any one facility. Once a vendor has been added to the system, a user wishing to add a vendor to a facility may find the vendor already listed in the system, and thus can simply add the vendor to the facility (subject to approval) without the necessity of further identification.

In some embodiments, a system may include information relating to a network of facilities. In this case, a user may find identification information that has already been added to the system for one facility, and, subject to approval, add the vendor to the desired facility. Furthermore, in some embodiments, a user entering vendor information may, subject to approval, add the vendor to a multitude of facilities at one time.

Authorization Process

After a vendor's identification information has been added to the system (subject to approval), at Step 120 a user creates an Authorization Schedule for a vendor. To grant a vendor access to the facility, a representative of the facility must create an authorization which specifies the conditions of the vendor's access. Requirements for authorizations can include, for example, any combination of the following, as determined by the facility:

- A specific schedule, including at least one of Single day, Round trip (two day), recurring visit, etc.
- Estimated time of arrival
- Whether allowed to enter facility only once or multiple times on days scheduled
- Expected duration of stay
- A specific class of vehicle (e.g. van, truck, tractor trailer, etc.)
- A specific vehicle
- A vendor in a certain class of category (janitorial, emergency, law enforcement)
- Specific driver or other representative of the vendor
- Whether vendor has met all requirements for the facility, including but not limited to valid certificate of insurance on file with facility, size and weight requirements, etc.

An authorization is issued once a desired set of the requirements are met. In some embodiments, Authorization may be given based on meeting one requirement, all requirements or a desired set of the requirements. In alternative embodiments of the invention, the authorization process may be subject to approval by a higher-authority user (see Approval Process) as shown, for example, in Step 130.

Additionally, in some embodiments, the Authorization Process may include the ability for representatives of the vendor to access the system in order to create authorizations for themselves on behalf of their customer(s) at the facility. The vendor user could also pre-register vehicles and drivers/employees with the system prior to their arrival at the facility, improving the efficiency of the Access Process.

In some embodiments of the invention, the authorization can include specific access rights to a subset of specific locations within a facility. For example, if the facility has multiple loading docks, multiple routes, or secured areas, the authorization can specify to which of the areas the authorization applies.

Approval Process

In some embodiments, an approval process may be applied to various processes, including but not limited to the Vendor Identification Process and Authorization Process, as shown, for example, in Steps 110 and 130. The approval process may follow a hierarchical structure of authority, where users of the highest authority require no approval and users of lesser authority may require the approval of the users in each level above them until all levels are satisfied.

Each level in the hierarchy may determine which of the levels below that level require its approval, thereby possibly creating gaps in the chain. If none of the levels above a particular user or group of users require approval of an action, the action is approved by default. However, if any level above the particular user or group of users requires approval for an action, each level in turn must approve the action until all levels are satisfied. If any one level denies a request, the process ends there without going further up in the approval chain.

In some embodiments, a peer review structure may be employed, rather than, or in addition to, a hierarchical structure. In these embodiments, a user or group of users not requiring approval from a higher level of authority may still be required to have approval of at least one peer of similar authority to the user.

Access Process

Referring now to FIG. 1*b*, the method of FIG. 1*b* starts at Step 140, when a vendor (typically the vendor's vehicle, or a representative of the vendor) arrives at the facility, and begin an Access Process at Step 150. Persons employed by the facility prevent vehicles and people from entering the facility until the authorization can be verified. In some embodiments, since vendors are typically corporate entities, and authorizations primarily grant vendors (not individuals) access to the facility, a determination of the vendor identity is made upon the arrival of representatives from a particular vendor. This determination is made by assessing prior associations made between the vendor and its vehicles and/or representatives (drivers/employees). When no such association exists, the determination must be made by inquiring from the vendor representative, or by use of other elements including but not limited to: manifest of delivery, name of customer being delivered to, or specific authorization number. This determination is then used to establish an association used for subsequent authorization verification by the vendor. If an association cannot be established and/or authorization cannot be verified by any other means, the representative and vehicle will be denied access.

In some embodiments, credentials and/or identification information of the vendor's representative and/or the vehicle may be provided before arrival, so that an association between the representative and vendor can be established more quickly. In such instances, particularly when a new driver or vehicle is scheduled to visit the facility, credentials can be compared quickly without the need to enter information into the system.

Once the appropriate authorization(s) have been found, at Step 160 the user may create a record of delivery (referred to herein as a "ticket") and the vendor may be granted access to the facility or an area within the facility (e.g., a marina, loading dock, or warehouse). In some embodiments, the ticket may include multiple delivery authorizations and is used to track a vendor's activity at the facility.

In some embodiments, a ticket as used herein may refer to a physical document and/or a digital record. Additionally, a ticket may be a physical object, such as an ID card, a paper or sticker with a printed barcode, and RFID fob, etc., or biometrics, such as a fingerprint scan, voice recognition, facial recognition, etc., any of which may be associated with a digital record, and/or with a security system for tracking the location of the vendor and/or the vendor's vehicle.

In some embodiments of the present invention, a vehicle may be identified by license plate number. As a vehicle approaches the facility, the license plate number is input into the system, either manually by a person, or automatically, for example, by means of an Automated Number Plate Recognition (ANPR) system. If the system has a record of a vehicle with matching plate number, the vendor or person associated with the vehicle is identified and/or displayed in the system along with any authorizations that may exist. In the event that at least one valid authorization exists, the vehicle is permitted to enter the facility.

In some embodiments of the present invention, the vehicle may be identified by means other than the license plate, such as, for example, by the Vehicle Identification Number (YIN), a special decal or other visual marker, or a code, etc. In some embodiments, the vehicle may be identified by use of a wireless signal, such as, for example, an E-Z Pass-type device, RFID, Bluetooth signal, etc.

If the system does not contain a record matching the vehicle, the guard may then ask the name of the vendor that requires access or otherwise establish the name of the vendor and input that information into the system. In some embodiments this may be accomplished automatically, for example, by use of an image capture device (e.g., a video recorder or camera), image recognition software, and an internet connection. In this case, an image an unknown company logo on a vehicle may be captured and can be searched for to quickly identify the vendor name Once the vendor's name is known and entered into the system, a record for the vehicle is created, and the association with the vendor is established. Any authorizations that exist for the vendor are then presented. In the event that a valid authorization exists, the vehicle is permitted to enter the facility.

In some embodiments of the present invention, persons representing the vendor may be identified by means of a driver license (or any other valid form of identification, such as government-issued identification). The driver license number, name, and/or other information from the driver license is input into the system by a person or document scanner. If the system has a record of a person with matching information, the vendor associated with the person is identified in the system and/or displayed along with any authorizations that may exist. In the event that a valid authorization does exist, the person is permitted to enter the facility.

If the system does not contain a record matching the person and the association with the vendor has not already been established (by means of the vehicle above), the guard may then ask the name of the vendor that requires access and input that information into the system. In some embodiments, this process may be done automatically, for example, by use of a digital image device, facial recognition software, and an internet connection, wherein the image of the individual may be searched for information. An association is established between the person and the vendor, and any authorizations for the vendor are revealed. In the event that a valid authorization does exist, the person is permitted to enter the facility.

Accounting Process

Continuing with Step 160, as explained in further detail below, in some embodiments the ticket is the primary mechanism for auditing a vendor's activity at the facility. Beginning with the Access Process (see Step 150), the ticket includes records including but not limited to:

Time of arrival at facility
User responsible for check-in
Authority for check-in, if required
Identity of vendor representative(s)
Identity of vehicle
Assigned parking spot or bay
Areas where vendor is authorized to access After a vendor enters the facility, they may be stopped at additional points throughout the facility. The stop can be, for example, by a guard at a security checkpoint requiring a showing of the ticket, or an automated locked door or gate requiring a digital scan of the ticket. At each point a record can be made manually and/or automatically in association with the ticket, which will act as an audit trail for the vendor's activity while at the facility, and may include a verification that the vendor and/or vehicle has left the facility, as shown in Step 170.

In some embodiments of the present invention, the system allows a designated user the authority to assign a location to a permitted vehicle. In some embodiments of the present invention, the system allows a designated user the authority to indicate expected time of arrival of a vendor, vehicle or person. In order to indicate a vendor, vehicle or person, the system must maintain a record of vehicles, vendors and/or persons.

System Access

As described in greater detail below (see descriptions of FIGS. 5-8 generally), in some embodiments of the invention, the system may be implemented in a web application that may reside on one or more servers accessible via a network, such as the Internet (or an intranet). Users access the application via a web browser or client application on a computer or mobile device (e.g. tablet, smart phone) to provide access of a vendor to one or more facilities.

In some embodiments of the invention, the system may include a client application for mobile devices that runs natively on the target platform, such as iOS, Android, Symbian, or Windows Mobile, for example. The client application would communicate with the web application over the network.

In some embodiments of the invention, the system prevents unauthorized access to the system by requiring authentication of persons interacting with the application. In some embodiments of the invention, the system may differentiate between authenticated users of the system by assigned user roles. These user roles are used to grant specific permissions to certain users based on their relationship to one or more facilities and/or vendors, and the functions they are required to perform.

Example Overview Sequence of Events

In some embodiments of the present invention, a typical sequence of events pertaining to the system from before a vendor arrives at a facility, until the time of departure may include any and/or all of the following steps, though not necessarily in the order presented:

1) Identification of vendor(s) by tenant on facility
2) Collection of vendor requirements for facility by tenant or facility
   Collection from users
3) Approval of vendor by facility (may be required)
   Vendor meets specified criteria for approval—criteria collected by users.

4) Scheduling of authorization by user
   - User schedules vendor based on a standard calendar, or specific event
   - Schedule may include daily, recurring daily, weekly, monthly, quarterly
   - Schedule may include multiple trips in a day
   - Schedule may include all dates and time or specific days of the week or times of the day or a combination 5) Schedules may require approval 6) Authorization of vendor may require approval 7) In order to provide access to a vehicle in a facility:
   - vendor must be approved and on schedule and vehicle must be identified as associated to vendor
   - vehicle is identified as being related to a vendor and vendor is approved and on schedule 8) To generate permitted access, authorization must be retrieved from system by at least one of the following:
   - vendor named
   - vehicle-vendor-association
   - driver-vendor-association 9) Once Access is permitted, a location for the vehicle may be assigned, (if not already assigned).

10) Once Access to facility is permitted, all movement throughout facility, including exit from facility may be recorded 11) Recording of vendor/vehicle/person arrival
    - association of authorization with vehicle, vendor, driver/person
    - audit of locations authorized (bays, floors, etc.)
    - audit of duration of stay, arrival and departure.

Adding Vendors to a Facility

Referring again to the embodiment of FIG. 1*a* in more detail, at Step 100 a person with the appropriate user role to a facility (tenant or facility management) can add vendors to the facility by finding the desired vendor from a list of vendors already known to the system. If the desired vendor is not already known to the system, it can be added by providing sufficient information to identify the vendor. This includes but is not limited to: name (as referred to), legal name, D.B.A. and/or other titles, contact information, description of business, vendor category, etc.

At Step 110, in some embodiments an approval process may apply if it is required by the facility. In this case, depending on the user's role with respect to the facility to which they wish to add a vendor, the act of adding the vendor to the facility may remain incomplete pending approval by a user with a higher-level authority. Users with higher-level authority may approve the action of lower-level users, and may not themselves require approval for vendors they wish to add. In some embodiments, once a vendor has been added to a facility (and approved, if applicable), it can be authorized for access to the facility, shown at Step 120. This process is shown in greater detail in FIG. 2.

Figure 2:
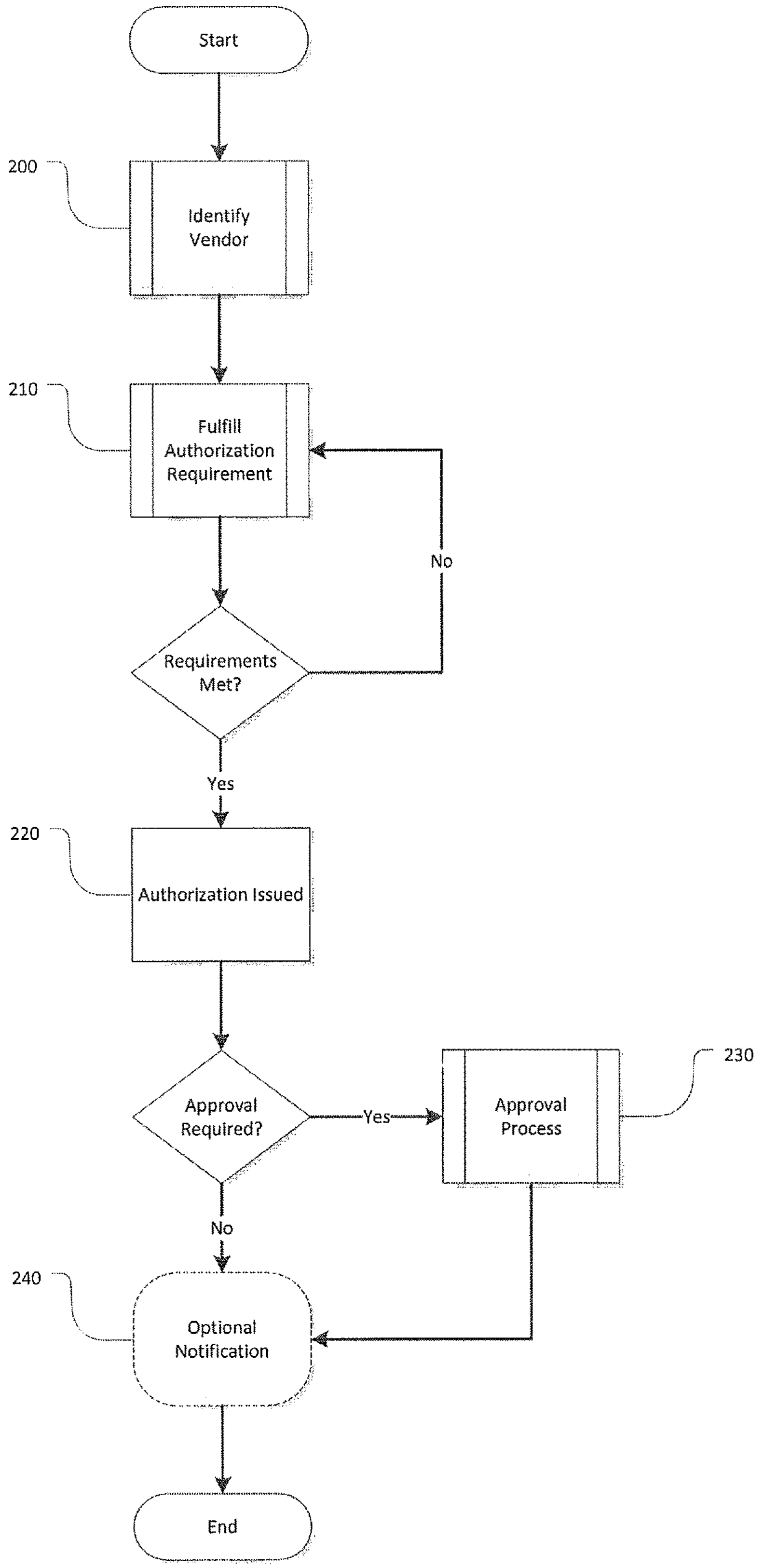
FIG. 2 is a flow diagram depicting an Authorization creation process according to some embodiments of the present invention.

As shown in FIG. 2, in some embodiments of the invention, the process of creating an authorization for a vendor begins at Step 200 with the user identifying a vendor from the list of vendors associated with the facility. In some embodiments, this may be all that is required for a vendor to be authorized for access. However, other embodiments of the invention may include further limiting the vendor's access by any number of possible methods including, but not limited to:

- A specific schedule, including at least one of: single day, round trip (two day), recurring, etc.
- Estimated time of arrival
- Whether allowed to enter facility only once or multiple times per day scheduled
- A maximum duration of access
- A specific class of vehicle (e.g. van, truck, tractor trailer, etc.)
- A specific vehicle
- Specific driver or other personnel representative of the vendor
- A specific location or resource (e.g. parking space, loading dock bay, freight elevator, maritime dock, etc.)
- Whether vendor has met all requirements for the facility, including, for example, valid certificate of insurance on file with facility
- Size of vehicle—height, width, length, weight, turning radius, etc.

In some embodiments, a facility may require that authorizations include one or more of the previous limitations. As such, at Step 210 the user creating the authorization specifies the parameters for each limitation required. Furthermore or alternatively, in some embodiments a user may be prevented from creating an authorization for vendor access if the facility has imposed additional requirements for eligible vendors and scheduling, including, for example:

- A specific category of vendor (e.g. janitorial, emergency, law enforcement, HazMat, etc.)
- Whether vendor has met all requirements for the facility, including, for example, valid certificate of insurance on file with facility
- A maximum number of days in the future for which a vendor may be scheduled (limits user from scheduling recurring deliveries in perpetuity)
- A maximum number of days for which the schedule may apply within a given date range
- A maximum number of days in advance for which a vendor may be scheduled with respect to the expiration date of a certificate of insurance on file with the facility
- Hours and/or days of operation In some embodiments of the invention, an authorization for access may require scheduling, and that schedule may be subject to limited availability of an applied resource of the facility (e.g. parking space, loading dock bay, freight elevator, maritime dock, power supply, etc.). In this case, resource scheduling and conflict resolution can be applied to the process of generating the authorization.

In some embodiments of the invention, the process of creating an authorization with a schedule may include measuring resource usage relative to maximum thresholds. In this case, the user may be, for example, presented with additional information concerning the authorization schedule relative to the resource for the overall purpose of more equally distributing the usage of the resource. For example, the user could be given an indication of anticipated high-volume time periods for the date(s) and/or time(s) selected, relative to the facility as a whole, one or more loading docks, bays, or parking areas.

In some embodiments, once all requirements for authorization have been satisfied, at Step 220 the authorization may be issued. However, in other embodiments the authorization may yet be subject to an approval process at Step 230, should it be required by either the facility or a higher authority than the user creating the authorization. This approval process is also shown in Step 130 of FIG. 1*a*, and could be similar or identical to that described above.

In some embodiments of the invention, at Step 240 notification of the new authorization may be dispatched to interested parties. Notification can be via email, SMS, instant message, phone call, or other means.

Figure 3:
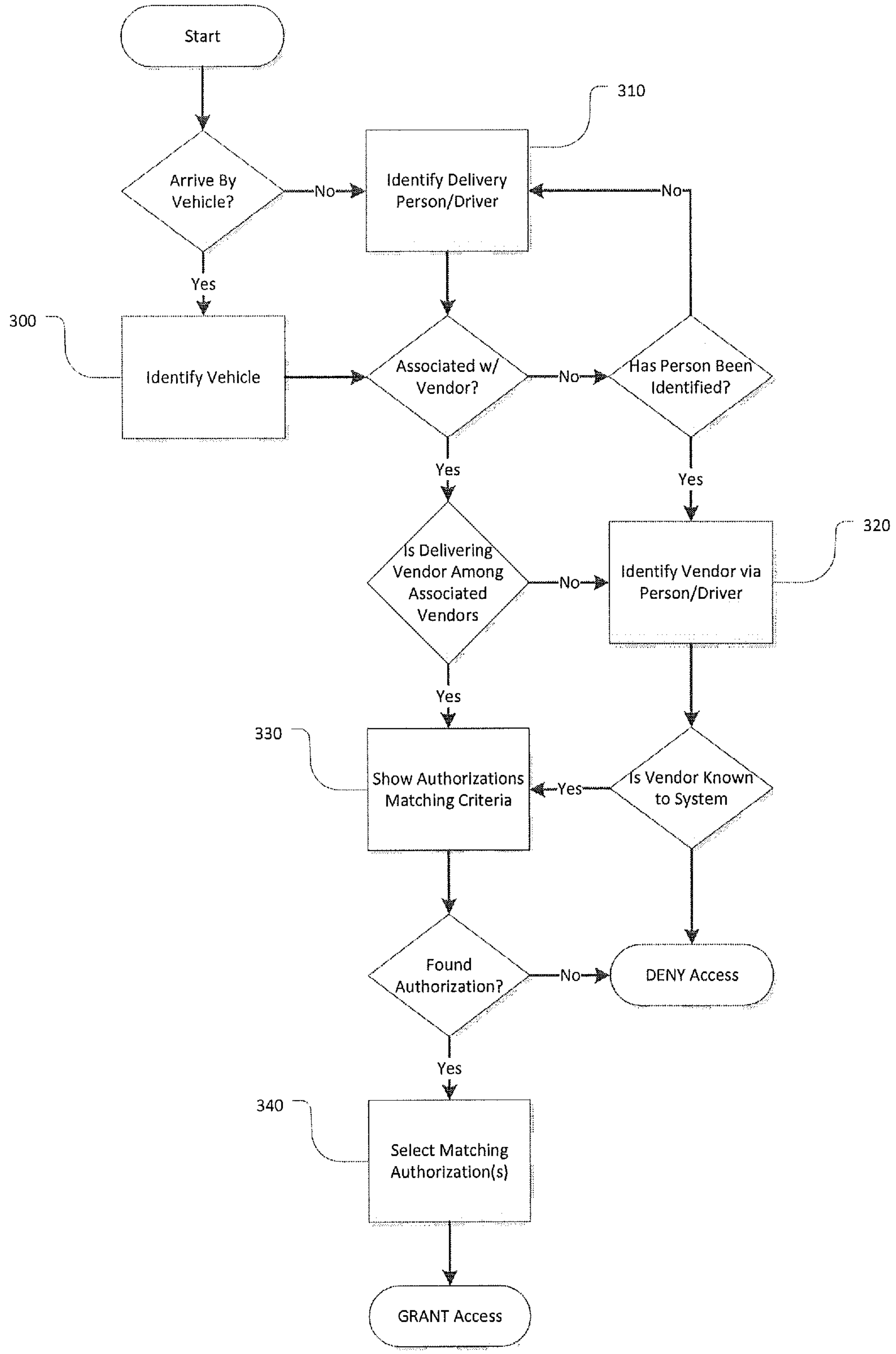
FIG. 3 is a flow diagram depicting an Access process according to some embodiments of the present invention.

As seen in the embodiment of FIG. 1*b*, the Access Process (Step 150) may begin once a vendor has arrived at the facility (Step 140). An embodiment of the Access Process is shown in greater detail in FIG. 3. When a vehicle arrives at a facility, a determination may be made whether to grant or deny access to the facility based on the authorizations present for the vendor associated with the vehicle. As seen in FIG. 3, when a vendor arrives by vehicle, the process begins at Step 300 with identification of the vehicle. In some embodiments, vehicles may be identified by various means, including, for example:

- License Plate Number
- Vehicle Registration information
- Vehicle Identification Number
- A private registration code
- Barcode
- RFID or any other wireless communication, such as Bluetooth, Near-Field Communication (NFC), etc.
- E-Z Pass or similar device This identification may be performed automatically by automated systems (e.g. Automated Number Place Recognition, E-Z Pass, RFID, etc.) or manually, and inputted into the system (also, automatically or manually).

In some embodiments, when the system finds a vehicle matching the identification of the arrived vehicle, at Step 330 the user is presented with a list containing the associated vendor(s) and authorizations relating to said vendor(s). The association between vehicle and vendor may be based on past instances where the vehicle arrived on behalf of the vendor, or possibly a manually established relationship between the vendor and one or more vehicles.

In some embodiments, at Step 310 the user may also input the identification of the vehicle's driver and/or other passengers. The identification of the driver or other passengers may be used as an alternative to or in addition to the vehicle identification to establish the identity of the vendor, as shown in Step 320. In some embodiments, where neither the driver (nor other passengers) nor vehicle yields an association with a vendor, or if the arriving vendor is not among those already associated, the user may manually establish the association to the correct vendor if the vendor is known to the system.

In some embodiments, should the vendor be unknown to the system or known but for which there are no valid authorizations, the vehicle may be denied access. If at least one valid authorization exists, at Step 340 the user selects the authorizations that are valid for the occasion from among those listed. A record of the vehicle's arrival (a "Ticket") is created and associated with the selected authorizations, and the vehicle is granted access. As explained above (FIG. 1*b*, Step 160), once the vehicle has been granted access to the facility the ticket serves as a record of the vehicle's activity throughout the duration of its stay.

Figure 4:
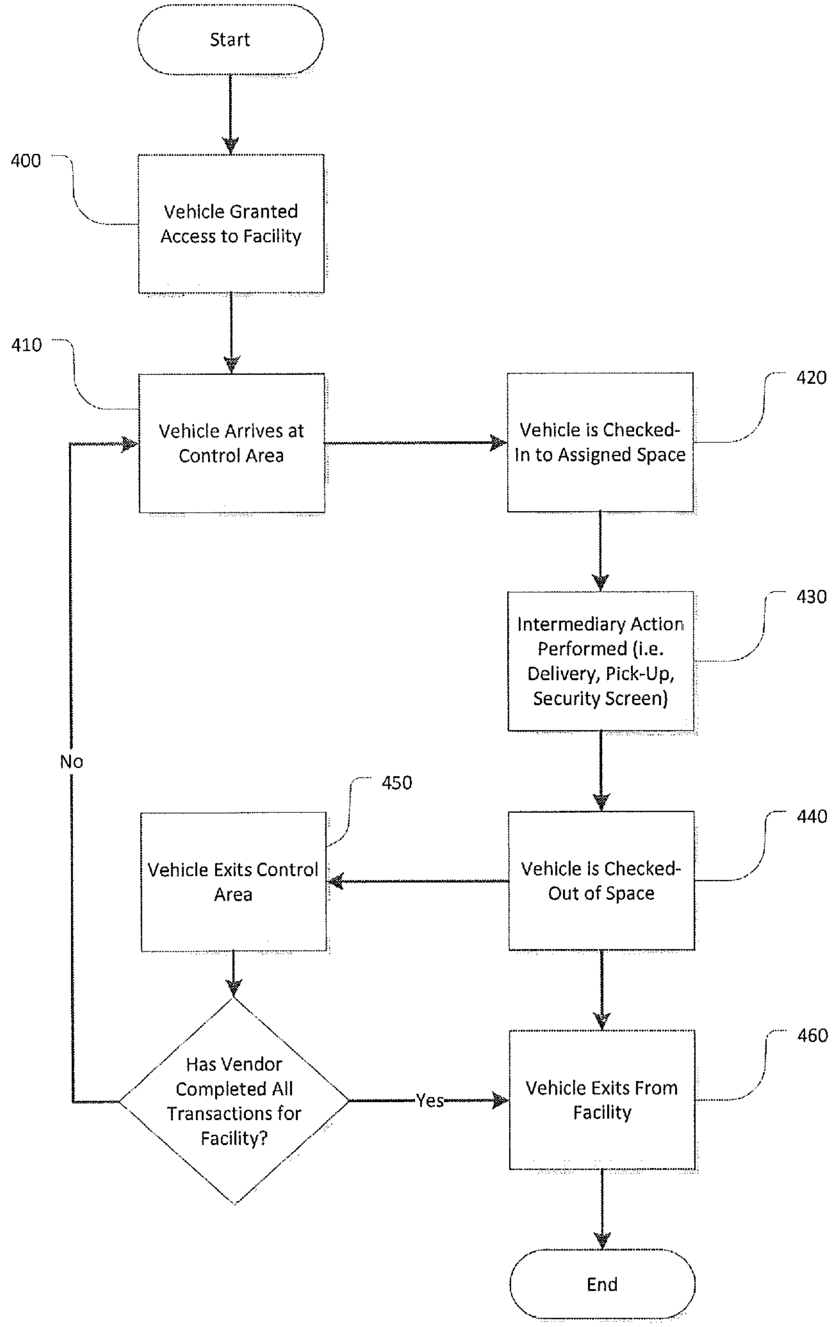
FIG. 4 is a flow diagram depicting a Vehicle Audit process according to some embodiments of the present invention.

As shown in the example embodiment of FIG. 4, when a vehicle is granted access to a facility at Step 400, it may proceed to a control area (e.g. loading dock, security screening area, parking lot, etc.) at Step 410. The vehicle's arrival at the control area may be recorded on or in association with the ticket, for example, automatically by automated vehicle identification (as described above) or manually by a user supervising the control area.

In some embodiments of the invention, at Step 420 the vehicle is further tracked while in the control area by being assigned a space or resource such as a bay in a loading dock, or parking space. At Step 430 the vendor then performs the action for which they were granted access. The vehicle may then be checked-out of the assigned space or resource at Step 440, and then exits the control area at Step 450. In some embodiments, each step may be recorded on or in association with the vehicle ticket. In other embodiments, only designated steps may be recorded.

Additionally or alternatively, should the facility have multiple control areas and the authorization grants access to multiple areas, the vendor may repeat the process for each area in which the vendor is permitted until it has completed its business at the facility, at which point, the vendor exits from the facility at Step 460.

It should be noted that the present invention is primarily described herein in terms of an electronic application, however, the present invention is not limited to an electronic application and may be implemented on other platforms. It will be understood by those of ordinary skill in the arts that the application may be any suitable software, hardware or both configured to implement the features of the present invention. The application may be implemented on any suitable platform (i.e. personal computer, laptop computer, touch pad computer, tablet, smartphone, multimedia device, or on any other device) to provide such features for a variety of users, including but not limited to businesses, educational institutions, medical facilities, construction sites, factories, government facilities, and public spaces, etc.

In some embodiments, the electronic application may be located in a central location (i.e. a central server). In another embodiments, the electronic application may reside among different locations (i.e. a network). In some embodiments, the electronic application may include vender-side software and/or hardware, user-side software and/or hardware, or both.

Figure 5:
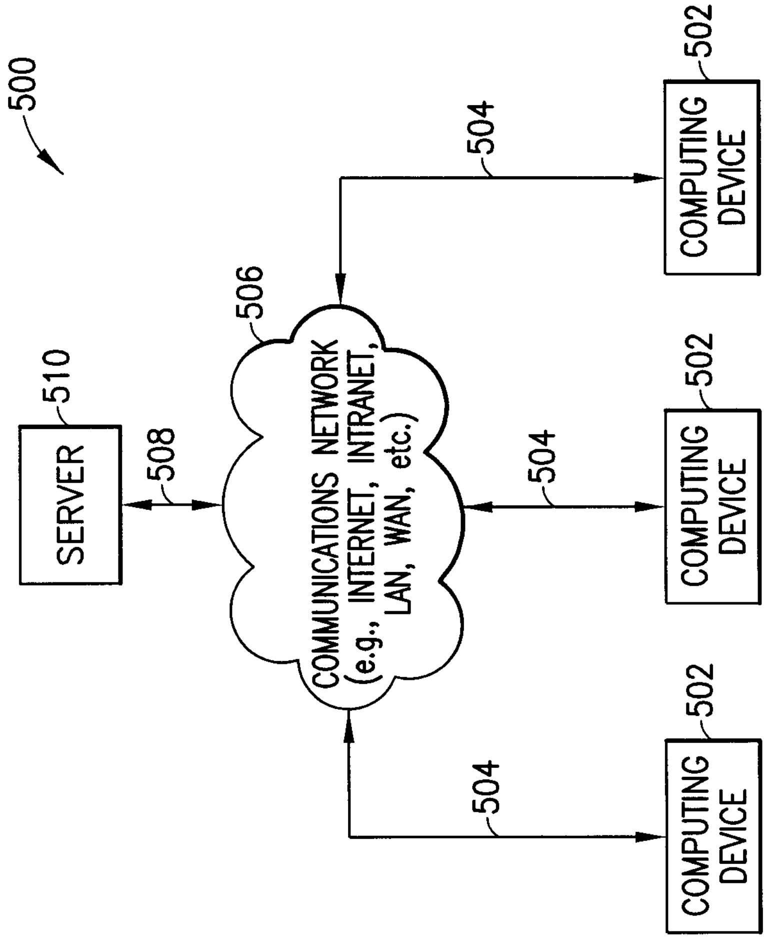
FIG. 5 is a generalized schematic diagram of a representative system on which an interactive user display application may be implemented in accordance with some embodiments of the present invention.

FIG. 5 is a generalized schematic diagram of a system 500 on which an interactive user display application may be implemented in accordance with some embodiments of the present invention. As illustrated, system 500 may include one or more user computing devices 502. User computing devices 502 may be local to each other or remote from each other, and wired, wireless, or a combination of both. User computing devices 502 are connected by one or more communications links 504 to a communications network 506 that is linked via a communications link 508 to a server 510.

System 500 may include one or more servers 510. Server 510 may be any suitable server for providing access to the application, such as a processor, a computer, a data processing device, or a combination of such devices. Communications network 506 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 504 and 508 may be any communications links suitable for communicating data between user computing devices 502 and server 510, such as network links, dial-up links, wireless links, hard-wired links, any other suitable communications links, or a combination of such links. User computing devices 502 enable a user to access features of the application. User computing devices 502 may be personal computers, laptop computers, mainframe computers, dumb terminals, data displays, Internet browsers, personal digital assistants ("PDAs"), smartphones, tablets, multimedia devices, two-way pagers, wireless terminals, cellular phones, portable telephones, handheld devices, any other suitable access device, or any combination of such devices. User computing devices 502 and server 510 may be located at any suitable location. In one embodiment, user computing devices 502 and server 510 may be located within an organization/entity. Alternatively, user computing devices 502 and server 510 may be distributed between multiple organizations/entities.

Figure 6:
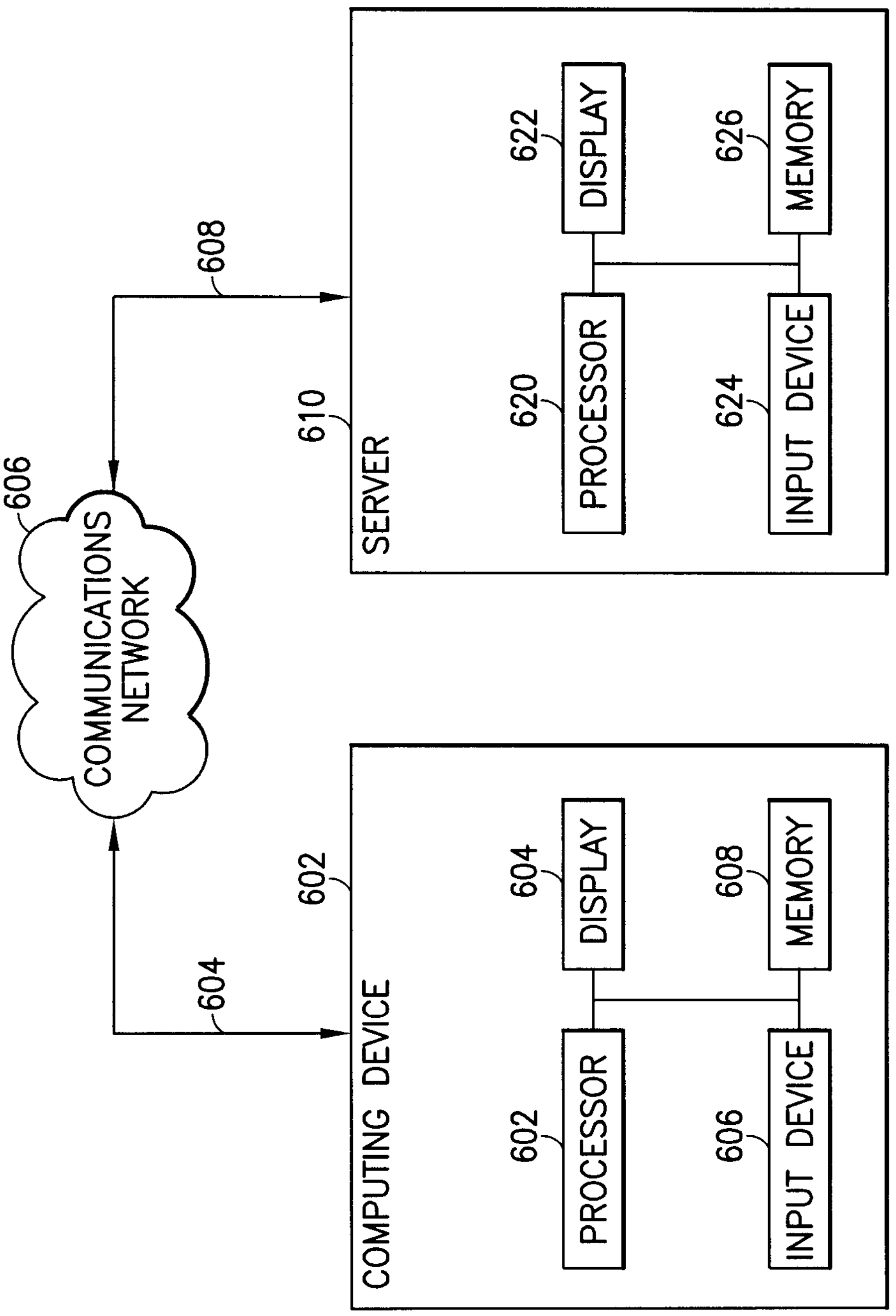
FIG. 6 is a schematic of the system of FIG. 5 depicted in more detail the server and a user computer in accordance with some embodiments of the present invention.

A server and a user computing device, such as those depicted in FIG. 5, are illustrated in more detail in FIG. 6. Referring to FIG. 6, computing device 602 may include processor 602, display 604, input device 606, and memory 608, which may be interconnected. In a preferred embodiment, memory 608 contains a storage device for storing a program for controlling processor 602.

Processor 602 uses the program to present on display 604 the application and the data received through communications link 604 and commands and values transmitted by a user of computing device 602. It should also be noted that data received through communications link 604 or any other communications links may be received from any suitable source. Input device 606 may be a computer or device keyboard, a cursor-controller, dial, switchbank, lever, button, or any other suitable input device as would be used by a designer of input systems or process control systems. In some embodiments, input device 606 may be any device with a Musical Instrument Digital Interface (MIDI), which enables, computers, and other suitable equipment to communicate, control, and synchronize with each other.

Server 610 may include processor 620, display 622, input device 624, and memory 626, which may be interconnected. In a preferred embodiment, memory 626 contains a storage device for storing data received through communications link 608 or through other links, and also receives commands and values transmitted by one or more users. The storage device further contains a server program for controlling processor 620.

In some embodiments, the application may include an application program interface (not shown), or alternatively, the application may be resident in the memory of computing device 602 or server 610. In another suitable embodiment, the only distribution to computing device 602 may be a graphical user interface ("GUI") which allows a user to interact with the application resident at, for example, server 610.

In some embodiments, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a computing device and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, an automobile PC, a laptop computer, tablet, multimedia device, a cellular phone, a personal digital assistant ("PDA"), smartphone, etc., to provide such features.

It will also be understood that the detailed description herein may be presented in term's of program procedures executed on a computing device or network of computing devices. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

Figure 7:
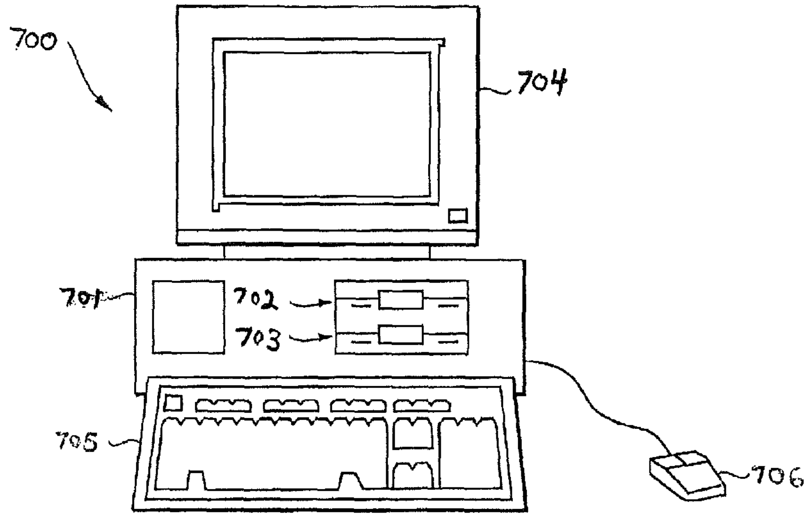
FIG. 7 illustratively depicts an exemplary diagram of computer system utilizable for employing the methods and systems of the present invention in accordance with some embodiments of the present invention.

The processes and procedures of the present invention may be implemented in any computer system or computer-based controller or device. One example of such a system is described in greater detail below with reference to FIG. 7. More specifically, FIG. 7 is an illustration of a computer 700 used for implementing the computer processing in accordance with a computer-implemented embodiment of the present invention. The procedures described above may be presented in terms of program procedures executed on, for example, a computer or network of computers, including local and/or global area networks such as the Internet.

Viewed externally in FIG. 7, computer 700 has a central processing unit (CPU) 701 having disk drives 702, 703. Disk drives 702, 703 are merely symbolic of a number of disk drives that might be accommodated by computer 700, internally or externally attached. Typically, these might be one or more of the following: a removable disk drive 702, a hard disk drive (not shown), and a CD ROM or digital video disk, optical disk memory, solid-state drive (SSD), memory card, thumb drive, etc., as indicated by the slot at 703. The number and type of drives varies, typically with different computer and/or device configurations. Disk drives 702, 703 are, in fact, options, and for space considerations, may be omitted from the computer system used in conjunction with the processes described herein.

Computer 700 also has a display 704 upon which information may be displayed. The display is optional for the computer used in conjunction with the system described herein. A keyboard 705 and/or a pointing device 706, such as a mouse 706, may be provided as input devices to interface with central processing unit 701. To increase input efficiency, keyboard 705 may be supplemented or replaced with a scanner, card reader, or other data input device. The pointing device 706 may be a mouse, touch pad control device, track ball device, touch screen, or any other type of pointing device.

Figure 8:
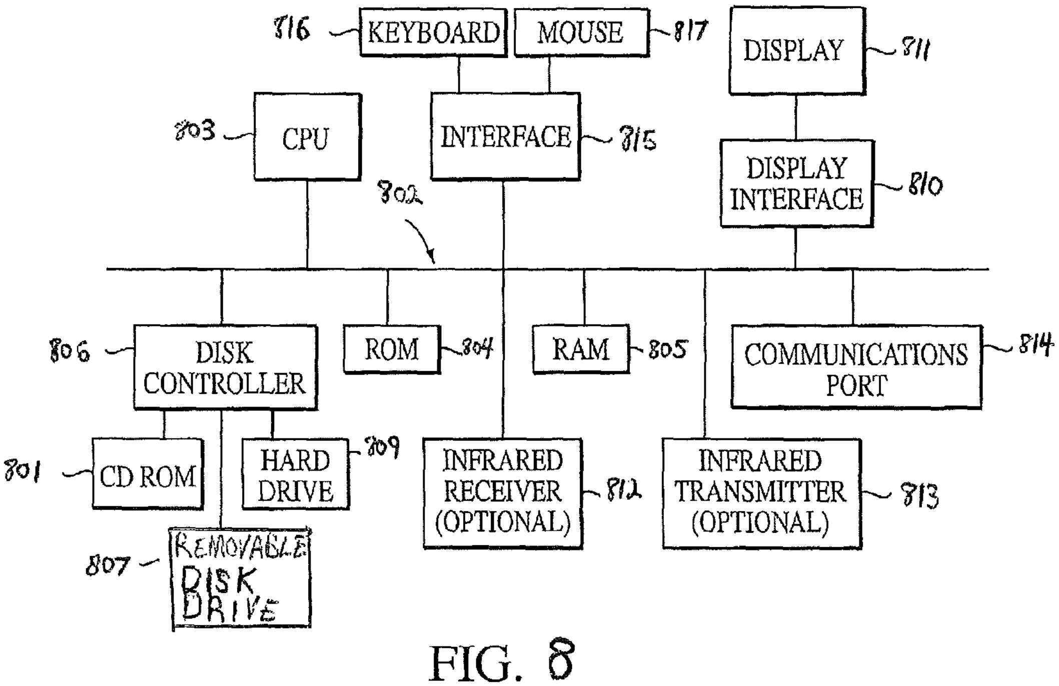
FIG. 8 illustratively depicts an exemplary block diagram of the internal hardware of the computer system of FIG. 7 in accordance with some embodiments of the present invention.

Alternatively or additionally, referring to FIG. 8, computer 700 may also include a CD ROM reader and writer 801, which are interconnected by a bus 802 along with other peripheral devices supported by the bus structure and protocol. Bus 802 serves as the main information highway interconnecting other components of the computer.

FIG. 8 illustrates a block diagram of the internal hardware of the computer of FIG. 7. CPU 803 is the central processing unit of the system, performing calculations and logic operations required to execute a program. Read only memory (ROM) 804 and random access memory (RAM) 805 constitute the main memory of the computer. Disk controller

806 interfaces one or more disk drives to the system bus 802. These disk drives may be removable disk drives such as 807, or CD ROM or DVD (digital video/versatile disk) drives, as at 808, or internal or external hard drives 809. As previously indicated these various disk drives and disk controllers are optional devices.

A display interface 810 permits information from bus 802 to be displayed on the display 811. Again, as indicated, the display 811 is an optional accessory for a central or remote computer in the communication network, as are infrared receiver 812 and transmitter 813. Communication with external devices occurs using communications port 814.

In addition to the standard components of the computer, the computer may also include an interface 815, which allows for data input through the keyboard 816 or pointing device, such as a mouse 817, or a touch-screen.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims. As another example, the system according to the invention may include a general purpose computer, or a specially programmed special purpose computer. The user may interact with the system via e.g., a personal computer or over PDA, e.g., the Internet or Intranet, etc. Either of these may be implemented as a distributed computer system rather than a single computer. Moreover, the processing could be controlled by a software program on one or more computer systems or processors, or could even be partially or wholly implemented in hardware, such as a digital imaging device or other hand-held device.

Although the computer system 700 in FIG. 7 is illustrated as having a single computer, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on removable disk, provided on CD ROM, provided on optical disk memory, etc.

Any presently available or future developed computer software language and/or hardware components can be employed in such embodiments of the present invention. For example, at least some of the functionality mentioned above could be implemented using Visual Basic, C, C++, Ruby, or any assembly language appropriate in view of the processor being used. It could also be written in an interpretive environment such as Java and transported to multiple destinations to various users.

The many features and advantages of the embodiments of the present invention are apparent from the detail specification, and thus, it is intended by the appended claims to cover all such features and advantages of the invention that fall within the true spirit and scope of the invention. Further, since numerous modifications and variations were readily occurred to those skilled in the art, it is not desired to limit the invention to the exact construction and operation illustrated and described, and accordingly, all suitable modifications and equivalents may be resorted to, falling within the scope of the invention.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer, smartphone, tablet, or over PDA, e.g., the Internet, an Intranet, etc. Any of these, or their equivalents, may be implemented as a distributed computer system rather than a single computer. Similarly, the communications link may be a dedicated link, a modem over a POTS line, the Internet and/or any other method of communicating between computing devices and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, tablet, mainframe and super computers, as well as processing system network combinations of the same. Further, portions of the system may be provided in any appropriate electronic format, including, for example, provided over a communication line as electronic signals, provided on CD and/or DVD, provided on optical disk memory, solid-state drive (SSD), memory card, thumb drive, etc.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A method performed by a data processing system having a program for managing access of vendors to at least one facility and auditing activity of the vendors while at the facility, the method comprising:

receiving and storing, by the data processing system, identification information identifying a vendor intending to visit a facility prior to the vendor visiting the facility;

registering, by a user associated with the vendor via a web-based application, a vehicle and driver prior to said driver's arrival at the facility;

creating an authorization, by the data processing system, for the vendor to access the facility or one or more specific locations or resources within the facility, wherein the authorization specifies one or more conditions of the vendor's access comprising limiting the vendor's access by a specific schedule, an estimated time of arrival, a number of trips per day, a maximum duration of stay, a specific class of vehicle, a specific vehicle, a size of vehicle, a specific vendor category, a specific driver or other representative of the vendor, and the one or more specific locations or resources within the facility, and wherein the authorization is prevented from being created when the vendor is in a specific vendor category, the vendor has not met all requirements for the facility, the authorization exceeds a maximum number of days in the future for which a vendor may be scheduled, the authorization exceeds a maximum number of days for which the schedule may apply within a given date range, the authorization exceeds a maximum number of days in the future for which a vendor may be scheduled with respect to the expiration date of a certificate of insurance on file with the facility, or the authorization is outside the hours or days of operation of the facility;

verifying the authorization, by the data processing system, responsive to one or more established associations between the vendor and its vehicles or representatives, wherein access to the facility or to the one or more specific locations within the facility is granted responsive to the verification;

approving, by the data processing system, the authorization through a hierarchical structure of authority comprising one or more users with a highest level of authority and one or more users with lesser levels of authority wherein the one or more users with the highest level of authority require no additional approval to create or to verify the authorization and the one or more users with the lesser levels of authority require approval as determined by the users with the higher level of authority;

generating, by the data processing system, a record of delivery comprising a physical ticket and a digital record associated therewith recording at least one of time of arrival at the facility, user responsible for check-in, authority for check-in, identity of vendor representative, identity of vehicle, assigned parking spot, and areas where vendor is authorized to access; and automatically recording, by the data processing system, on or in association with the ticket, the vendor's activity while at the facility, including exit from the facility, responsive to automated vehicle identification at a plurality of automated checkpoints throughout the facility.

2. The method of claim 1, further comprising identifying the vehicle or identifying the individual accompanying the vehicle, wherein the vehicle is identified by at least one of a vehicle license plate, a specialized decal, a visual marker or signal, a wireless signal, an audible signal, and a vehicle code; and wherein the individual accompanying the vehicle is identified by at least one of valid identification documentation, a radio-frequency identification (RFID) card, facial recognition, and biometric verification.

3. The method of claim 1, further comprising the step of providing, by the data processing system, a notification of the authorization to the vendor prior to the intended visit.

4. A computer implemented system for managing access of vendors to at least one facility and auditing activity of the vendors while at the facility, the system comprising:

a database; and a computer processor coupled to the database, the computer processor configured to:

receive and store in the database identification information identifying a vendor intending to visit a facility, prior to the vendor visiting the facility;

register a vehicle and driver as requested by a user associated with the vendor via a web-based application prior to said driver's arrival at the facility;

create an authorization for the vendor to access the facility or one or more specific locations or resources within the facility, wherein the authorization specifies conditions of the vendor's access comprising, limiting the vendor's access by a specific schedule, an estimated time of arrival, a number of trips per day, a maximum duration of stay, a specific class of vehicle, a specific vehicle, a size of vehicle, a specific vendor category, a specific driver or other representative of the vendor, and the one or more specific locations or resources within the facility, and wherein the authorization is prevented from being created when the vendor is in a specific vendor category, the vendor has not met all requirements for the facility, the authorization exceeds a maximum number of days in the future for which a vendor may be scheduled, the authorization exceeds a maximum number of days for which the schedule may apply within a given date range, the authorization exceeds a maximum number of days in the future for which a vendor may be scheduled with respect to the expiration date of a certificate of insurance on file with the facility, or the authorization is outside the hours and days of operation of the facility;

verify the authorization responsive to one or more established associations between the vendor and its vehicles or representatives, wherein access to the facility or to the one or more specific locations within the facility is granted responsive to the verification;

approve the authorization through a hierarchical structure of authority comprising one or more users with a highest level of authority and one or more users with lesser levels of authority wherein the one or more users with the highest level of authority require no additional approval to create or to verify the authorization and the one or more users with the lesser levels of authority require approval as determined by the users with the higher level of authority;

generate a record of delivery comprising a physical ticket and a digital record associated therewith recording at least one of time of arrival at the facility, user responsible for check-in, authority for check-in, identity of vendor representative, identity of vehicle, assigned parking spot, and areas where vendor is authorized to access; and automatically record on or in association with the ticket, the vendor's activity while at the facility, including exit from the facility, responsive to automated vehicle identification at a plurality of automated checkpoints throughout the facility.

5. The system of claim 4, further comprising at least one of a vehicle identifying system and an individual identifying system, wherein the vehicle identifying system identifies at least one of a vehicle license plate, a specialized decal, a visual marker or signal, a wireless signal, an audible signal, and a vehicle code; and wherein the individual identifying system identifies an individual by at least one of valid identification documentation, a radio-frequency identification (RFID) card, facial recognition, and biometric verification.

6. The system of claim 4, wherein the computer processor is further configured to provide a notification of the authorization to the vendor prior to the intended visit.

7. A system performed on a computer processor having a program for managing access of vendors to at least one facility and auditing activity of the vendors while at the facility, the system comprising:

vendor identification means for adding identification information identifying a vendor intending to visit a facility to the system, and permitting registration by a user associated with the vendor via a web-based application of a vehicle and driver prior to the driver visiting the facility;

authorization means for creating an authorization for an approved vendor to access the facility or one or more specific locations or resources within the facility, wherein the authorization specifies one or more conditions of the vendor's access comprising limiting the vendor's access by a specific schedule, an estimated time of arrival, a number of trips per day, a maximum duration of stay, a specific class of vehicle, a specific vehicle, a size of vehicle, a specific vendor category, a specific driver or other representative of the vendor, and the one or more specific locations or resources within the facility, and wherein the authorization is prevented from being created when the vendor is in a specific vendor category, the vendor has not met all requirements for the facility, the authorization exceeds a maximum number of days in the future for which a vendor may be scheduled, the authorization exceeds a maximum number of days for which the schedule may apply within a given date range, the authorization exceeds a maximum number of days in the future for which a vendor may be scheduled with respect to the expiration date of a certificate of insurance on file with the facility, or the authorization is outside the hours or days of operation of the facility;

approval means to approve adding the vendor to the facility and/or issuing the authorization in accordance with an approval process, the approval process comprising at least one of verifying that all hierarchical approval required has been received and verifying that all peer approval required has been received, wherein the one or more users with the highest level of authority require no additional approval to create or to verify the authorization and the one or more users with the lesser levels of authority require approval as determined by the users with the higher level of authority;

access verifying means for verifying the authorization responsive to one or more established associations between the vendor and its vehicles or representatives, and granting access to the facility or to the one or more specific locations within the facility responsive to the verification; and auditing means for generating a record of delivery comprising a physical ticket and a digital record associated therewith recording at least one of time of arrival at the facility, user responsible for check-in, authority for check-in, identity of vendor representative, identity of vehicle, assigned parking spot, and the one or more specific locations within the facility where vendor is authorized to access; and automatically recording, on or in association with the ticket, the vendor's activity while at the facility, including exit from the facility, responsive to automated vehicle identification at a plurality of automated checkpoints throughout the facility.

8. The system of claim 7, wherein the access verifying means further comprises at least one of vehicle identifying means and individual identifying means;

wherein the access verifying means verifies that identification of at least one of a vehicle and an individual accompanying a vehicle is associated with an authorized vendor prior to access being granted to the facility; and wherein the access verifying means grants access responsive to at least one of the vehicle identifying means and the individual identifying means.

9. The system of claim 8, wherein the vehicle identifying means is configured to identify at least one of a vehicle license plate, a specialized decal, a visual marker or signal, a wireless signal, an audible signal, and a vehicle code; and wherein the individual identifying means is configured to identify an individual by at least one of valid identification documentation, a radio-frequency identification (RFID) card, facial recognition, and biometric verification.

10. The system of claim 7, further comprising:

notification means for providing a notification of the authorization to the vendor prior to the intended visit.

* * * * *